Feb. 17, 1959 D. L. LOMBARD ET AL 2,873,764
PIPE END SEALING APPARATUS FOR USE IN THE
PRESSURE TESTING OF PIPES AND TUBES
Filed July 6, 1955 2 Sheets-Sheet 2
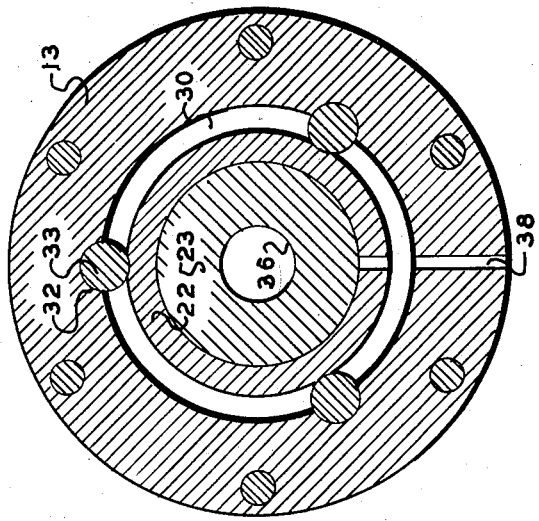
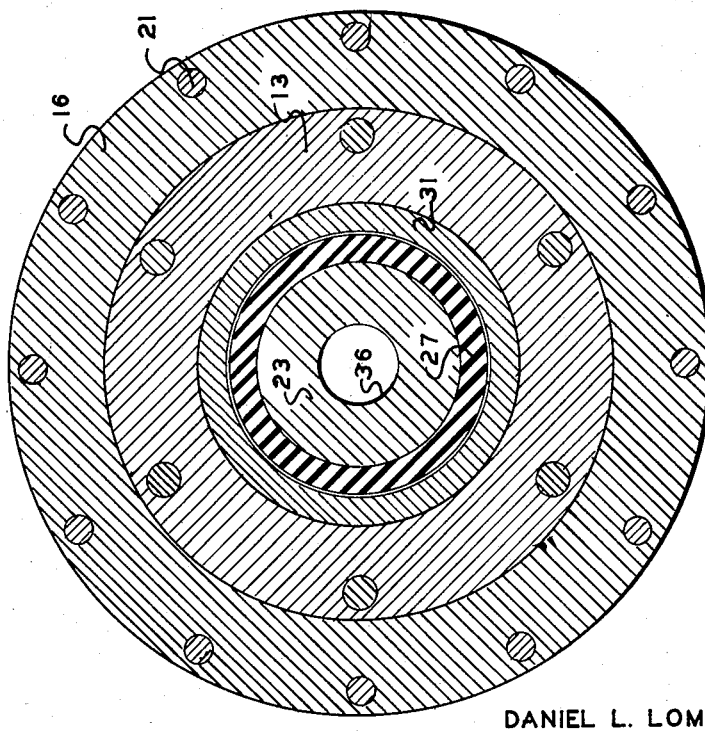
INVENTORS
DANIEL L. LOMBARD
WILLIAM R. JACKSON
BY *Francis J. Klempay*
ATTORNEY

United States Patent Office 2,873,764
Patented Feb. 17, 1959

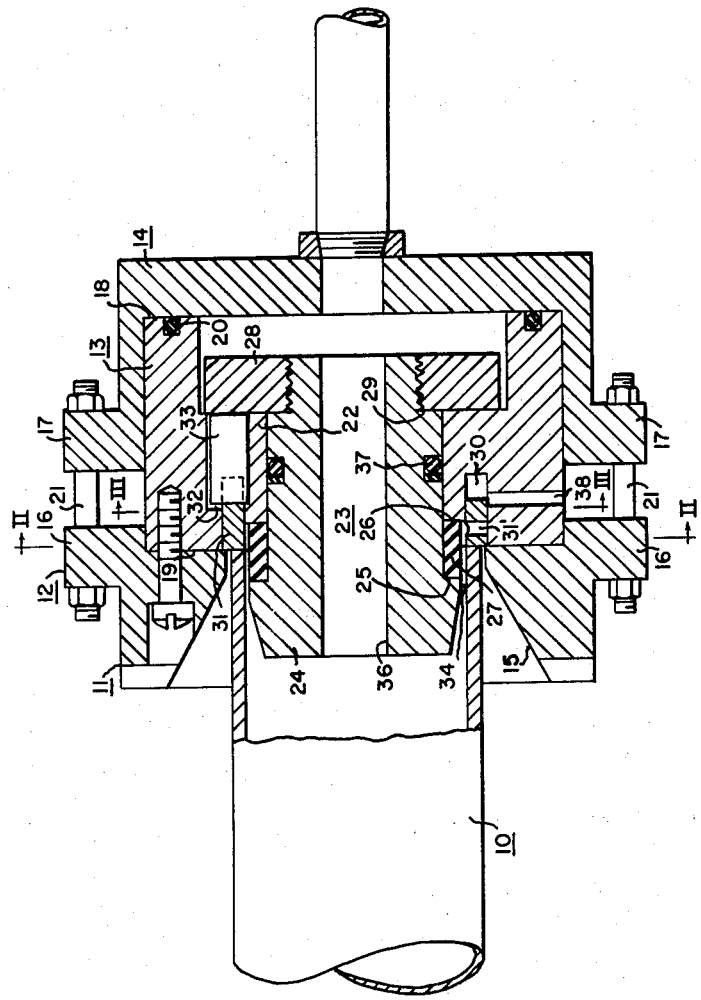

2,873,764

PIPE END SEALING APPARATUS FOR USE IN THE PRESSURE TESTING OF PIPES AND TUBES

Daniel L. Lombard, Youngstown, and William R. Jackson, Poland, Ohio, assignors to Lombard Corporation, Youngstown, Ohio, a corporation of Ohio Application July 6, 1955, Serial No. 520,189

7 Claims. (Cl. 138—90)

The present invention relates to apparatus for use in the hydraulic pressure testing of pipes and tubes, and more particularly to a novel and improved apparatus for sealing the ends of a pipe or tube so that hydraulic pressure may be applied internally thereof.

One of the primary objects of the present invention is the provision of a novel and improved device for incorporation in pipe and tube testing equipment which is operative in an improved manner to seal off the open ends of the pipe or tube so that hydraulic pressure may be properly applied thereto during testing.

A more specific object of the invention is the provision of an improved end sealing head for pipe and tube testing machines which is operative to seal off the end opening of pipes and tubes at the extreme end portion thereof so that a maximum portion of the tube length may be tested.

Another specific object of the invention resides in the provision of an improved end sealing head for pipe and tube testing machines which provides for the application of testing pressure to substantially the whole of the internal surface area of the tube, and which is particularly characterized by the provision of improved means for effecting sealing engagement between the tube and sealing head automatically upon application of the sealing head to the end of the tube.

Yet another specific object of the invention is the provision of a novel sealing head for pipe and tube testing machines which is provided with improved arrangements for employing the fluid pressure applied internally of the tube during testing thereof for effecting the desired fluid tight seal at the tube end. In this respect, it is acknowledged that so-called "self sealing" testing heads, broadly speaking, are old. The invention in the present instance, therefore, resides in certain specific improvements in "self sealing" heads whereby the same may be more effectively incorporated in high pressure tube testing installations.

The above and other objects and advantages of the invention will become apparent upon full consideration of the following detailed specification and accompanying drawing wherein is shown a certain preferred embodiment of our invention.

In the drawing:

Figure 1 is a longitudinal or axial section view of the sealing head apparatus of our invention; and Figures 2 and 3 are transverse section views of our apparatus taken along lines II—II and III—III respectively of Figure 1.

Referring now to the drawing the numeral 10 designates the end portion of a tube to be tested by the internal application of hydraulic pressure. The tube 10 may be of any length, and is engaged at each end by a sealing head 11 which closes off the end opening of the tube. Hydraulic pressure is then applied internally of the tube, generally through one of the sealing heads, so that the tube tends to expand outwardly. Any leaks or structural defects are readily ascertained in this manner.

The sealing head 11 of our invention comprises three main housing elements or sections 12, 13 and 14. At the forward or inner end of the sealing head 11 is the first mentioned of the housing sections, 12, which is an annular member having a tapered central opening 15 and an outer flange portion 16. The outermost of the housing sections, member 14, is generally cup shaped, opening in an inwardly or forwardly direction and having a flange 17 at its forward edge.

Intermediate the housing sections 12 and 14 is the third housing section 13 which is generally annular in shape, having end surface portions 18 and 19 adapted to have abutting engagement with corresponding surface portions of the end sections 12 and 14. At the outer end of the assembly an O-ring 20 is positioned at the engaging interface between the intermediate and outer body members 13 and 14 to provide a fluid tight seal. Tie bolts 21 spaced circumferentially about the assembly and engaging the opposed flanges 16 and 17 serve to maintain the thus described components in a rigid assembled relation.

As shown in Figure 1, the intermediate member 13 is provided with an axially elongated internal flange portion 22 which is located intermediate the ends of the member 13 and which is accurately machined to define an axially aligned internal opening. Within the opening thus defined is slidably received a sealing mandrel or plug member 23 which has an enlarged and tapered outer end or head portion 24 projecting inwardly into the oppositely tapered opening 15 of the annular inner body member 12.

Spaced from the inner end portion 24 of the mandrel 23 is an outwardly facing shoulder 25 which is spaced inwardly from and opposed to an inwardly facing shoulder 26 defined by the inner surface of the flange 22. The opposed shoulders 25 and 26 define a generally U-shaped channel or recess for the reception of an axially elongated annular resilient sealing ring 27.

At the rearward end of the plug or mandrel 23 there is threadedly received a collar 28 of relatively large diameter which is adapted to engage with the outwardly facing shoulder 29 of the flanged intermediate housing section 13. The collar 28 serves to limit the movement of the sealing mandrel 23 in an extending or inwardly direction, and thus to define a maximum spacing between the opposed flanges 25 and 26. And preferably the axial dimension of the sealing ring 27 is such that the same is snuggly received in the U-shaped recess defined by the shoulders 25 and 26 when the mandrel 23 is in its most extended position. Thus, the resilient sealing ring 27 functions to normally maintain the mandrel 23 in its extended position.

In accordance with the teachings of the invention the annular intermediate housing section 13 is provided on its inner or left hand end face with a deep axially extending annular groove 30. The inner diameter of the groove 30, as will be observed in Figure 1, is slightly larger than the outer diameter of the sealing ring 27. Received within the groove 30, and slidably retained therein, is a plunger ring 31 which normally projects outwardly of the groove 30. The annular plunger 31 is slightly larger in its outer diameter than the inside diameter of the tapered opening 15, so that the inner housing section 12 forms an abutment stop, limiting movement of the plunger 31 in a direction toward the opening 15.

Spaced circumferentially about the intermediate housing section 13, and intersecting the annular groove 30 therein, is a plurality of axial bores 32 in which are slidably received a like number of thrust pins 33. The pins 33 are of such a length as to normally engage the collar 28 and annular plunger 31 simultaneously.

As shown in Figure 1, there is a small annular space 34 between the outer surface of the mandrel 23 and the inner surface of the tapered opening 15. This space is sufficient to easily receive the end extremity of a tube 10, with the tapered end portion 24 of the sealing mandrel 23 and the tapered bore 15 of the front housing section serving to guide the tube 10 into the desired testing position. The inner or exposed end of the plunger ring 31 lies substantially within the annular space 34, defining an end thereof, and arranged to engage the leading end of the tube 10 upon the same being moved into testing position.

In conventional tube testing machines one or both of an opposed pair of sealing heads 11 will be mounted for axial movement in such a manner that the heads may be forcibly closed upon the ends of a tube moved into alignment therewith. Thus, assuming the tube 10 in Figure 1 to be fixed, the head 11 will be moved inwardly or to the left until the leading edge of the tube engages the plunger ring 31. Continued movement of the head 11 will cause the plunger ring 31 to be depressed by the end of the tube, the ring 31 moving into the groove 30 provided therefor. As the ring moves into the groove 30 the plurality of thrust pins 33 are carried along with the ring. And through the pins 33 and collar 28 the sealing mandrel 23 is held stationary while the housing 12—14 of the sealing head advances upon the tube 10.

As the housing part of the sealing head 11, that is, the assembled body parts 12—14, moves forwardly on the tube 10, while the mandrel 23 is held stationary through the plunger ring 31 and thrust pins 33, the space between the opposing shoulders 25 and 26, of the mandrel 23 and intermediate body part 13 respectively, becomes progressively smaller. This causes the sealing ring 27 to be compressed in an axial direction. The sealing ring is thereby caused to expand outwardly into contact with the side wall of the tube 10, at the extreme end portion thereof. And in this respect, the plunger ring receiving groove 30 is sufficiently deep to permit the sealing ring 27 to be deformed into good sealing contact with any tube of a prescribed nominal size which is within standard commercial tolerance limits.

Once the initial sealing contact has been made with the tube 10, in the manner above described, fluid under pressure is admitted to the interior of the tube through conduit 35, leading into the interior of the housing 12—14, and through an axial through bore 36 provided in the mandrel 23. This pressure acts outwardly upon the side walls of the tube 10, tending to burst the same, so that any leaks or defects can be readily detected.

In accordance with the teachings of the invention the pressure fluid within the tube 10 and housing 12—14 acts upon both ends of the mandrel 23. However, as will be observed in Figure 1, pressure acting rearwardly upon the mandrel 23 will act upon an area determined by the exanded diameter of the deformed sealing ring 27, while pressure acting forwardly upon the mandrel will act upon an area determined by the diameter of the intermediate or stem portions of the mandrel, which is somewhat smaller. Thus, the fluid pressure will tend to force the mandrel rearwardly or to the right with respect to the housing 12—14. This compresses the sealing ring 27 even further, to improve the sealing engagement between the tube 10 and mandrel 23; and, of course, the sealing contact pressure will increase as the testing fluid pressure is increased, so that adequate sealing pressure is provided under all circumstances.

In order to insure that the desired force differential is maintained on the mandrel 23 during testing operations we provide an O-ring sealing element 37 on the shank or stem portion of the mandrel 23 which seals off the rearward side of the sealing ring 27 from the testing pressure. And to avoid the building up of the pressure behind the main sealing ring 27 through leakage of fluid past the O-ring 37 we have provided a radial bore 38 in the intermediate housing part 13 which opens to the atmosphere and which extends radially inwardly to the mandrel 23. The bore 38 is positioned intermediate the O-ring sealing element 37 and the main sealing ring 27 so that there can be no substantial build-up of pressure between these elements, regardless of slight leakage which may occur about either or both of these elements.

As will be observed in Figures 1 and 3, the bore 38 passes through the plunger ring receiving groove 30, so that the passage would normally be shut off upon axial movement of the ring 31 into the recess. Therefore, we provide a radial bore 31' in the ring 31 which serves to connect the spaced parts of the main bore 38 when the ring 31 is fully depressed.

It will be observed that the plunger ring 31 in its normal position, has its exposed or tube abutting edge forwardly of the rearward edge of the sealing ring 27. The arrangement is such that when the tube 10 is moved into testing position, depressing the ring 31 into the groove 30, the sealing ring 27 contacts only the extreme outer end portion of the side wall of tube 10. In this manner a maximum portion of the tube is subjected to the testing pressure.

It should thus be apparent that we have accomplished the objects initially set forth. Our sealing head embodies several important features of novelty which adapt it for operation in an improved manner, and with improved test results. In this respect, we acknowledge such prior art arrangements as exemplified by U. S. Patent No. 2,578,728, to C. W. Musser, which illustrates certain of the basic features of our present apparatus without, however, embodying the several specific advantageous features which constitute our invention.

Thus, one of the improvement features of our apparatus is our novel arrangement for employing a predetermined percentage of the fluid pressure force applied to the tube during testing to further tighten the sealing head within the tube. The arrangement is such that fluid pressure is applied at both ends of a movable mandrel or plug member, but to a greater area at the inner end than at the outer end so that a resulting outward force upon the mandrel is realized. In this manner extremely high testing pressures may be used, with only a fractional amount of the testing pressure being applied to tighten the fluid seal.

One of the specific features of importance in respect of the above is the provision of auxiliary sealing means located outwardly of the main sealing ring 27, on a smaller diametered portion of the mandrel 23, in combination with a venting bore located intermediate the auxiliary and main sealing rings so that pressure cannot be built up outwardly of the main seal 27 through fluid leakage during the application of testing pressures.

Other advantageous features reside in specific construction arrangements, including the use of the plunger ring 31, which simplify assembly and maintenance of the apparatus and insure its proper operation under the more or less adverse operating conditions usually found in high production commercial operations.

It should be understood, however, that the embodiment illustrated and described herein is intended to be representative only, as many changes may be made in the specific structure thereof without departing from the clear teachings of the invention. Reference should therefore be made to the following appended claims in determining the full scope of the invention.

We claim:

1. In a tube end sealing device for use in the pressure testing of pipes and tubes and of the type having means to forcibly sealingly engage with the internal side walls of the tube upon movement of the device into pressure contact with the end of the tube, and having further means operative in response to the application of testing fluid pressure internally of the tube to increase the sealing force, the combination of a housing having a bored internal flange therein, a sealing mandrel slidably received in said bored internal flange, said housing being open at one end, said mandrel having an enlarged head portion projecting from the housing at said open end thereof, said enlarged head portion and said internal flange defining opposite end walls of a recess, a deformable sealing ring received in said recess and adapted to be deformed in an axial direction upon movement of the enlarged head portion of said mandrel in a first direction toward said internal flange, means operative by movement of a tube to be tested into testing position within said housing and over said mandrel to cause said mandrel to be moved in said first direction, means to admit fluid pressure to said tube and to portions of said mandrel on opposite sides of said internal flange, a sealing member engaging said flange and said mandrel, and a venting bore in said housing extending radially through said flange to said mandrel and located intermediate said sealing ring and sealing member.

2. In a tube end sealing device for use in the pressure testing of pipes and tubes and of the type having means to forcibly sealingly engage with the internal side walls of the tube upon movement of the device into pressure contact with the end of the tube, and having further means operative in response to the application of testing fluid pressure internally of the tube to increase the sealing force, the combination of a housing having a bored internal flange therein, a sealing mandrel slidably received in said bored internal flange, said housing being open at one end, said mandrel having an enlarged head portion projecting from the housing at said open end thereof, said enlarged head portion and said internal flange defining opposite end walls of a recess, a deformable sealing ring received in said recess and adapted to be deformed in an axial direction upon movement of the enlarged head portion of said mandrel in a first direction toward said internal flange, means operative by movement of a tube to be tested into testing position within said housing and over said mandrel to cause said mandrel to be moved in said first direction, means to admit fluid pressure to said tube and to portions of said mandrel on opposite sides of said internal flange, an annular groove in said housing adjacent the open end of said housing, a plunger ring received in said groove and slidable axially therein, and thrust pins extending axially through said flange and engaging said plunger ring and operatively engaging said mandrel whereby upon engagement of said plunger ring by the end portion of a tube said plunger ring, thrust pins and mandrel are moved bodily with respect to said housing to forcibly sealingly engage said sealing ring with said tube.

3. In a tube end sealing device for use in the pressure testing of pipes and tubes and of the type having means to forcibly sealingly engage with the internal side walls of the tube upon movement of the device into pressure contact with the end of the tube, and having further means operative in response to the application of testing fluid pressure internally of the tube to increase the sealing force, the combination of a housing having an opening at one end for the reception of the end portion of a tube, a sealing mandrel received in said housing and slidable axially therein, said mandrel having an enlarged head portion defining a shoulder, said housing having a shoulder spaced from said first mentioned shoulder and defining therewith a recess, a deformable sealing ring received in said recess, means to axially shift the position of said mandrel in said housing when a tube is inserted therein to deform said sealing ring into sealing engagement with the internal side walls of said tube, and means to apply testing fluid pressure internally of said tube and against both ends of said mandrel, the enlarged head portion of said mandrel presenting a larger effective area than the other end of said mandrel whereby upon the application of fluid pressure as aforesaid a differential fluid force is exerted upon said mandrel to cause further deformation of said sealing ring into tighter sealing contact with said side walls.

4. Apparatus according to claim 3 further including vent means intermediate the ends of said mandrel to prevent the buildup of balanced fluid pressure forces upon said sealing ring.

5. Apparatus according to claim 3 further including a plurality of thrust pins spaced circumferentially about said housing and operatively engaging said mandrel, said thrust pins being movable axially in said housing upon insertion of a tube therein whereby to shift said mandrel to initially deform said sealing ring.

6. Apparatus according to claim 5 further including a plunger ring received in and axially slidable in said housing and having normal abutting engagement with said thrust pins, said plunger ring being substantially of the same diameter as said tube and being engaged by the end of said tube upon insertion of the latter into said housing.

7. Apparatus according to claim 6 further characterized by said plunger ring being positioned in such axial relation to said housing that the tube engaging end surface thereof normally lies between the ends of said deformable sealing ring, the arrangement being such that upon engagement of said plunger ring by said tube and axial movement of said plunger ring in said housing said sealing ring is deformed into sealing engagement with the extreme end portion of the inner wall of said tube.

References Cited in the file of this patent

UNITED STATES PATENTS

| | | |
|---|---|---|
| 2,062,527 | Postlewhite | Dec. 1, 1936 |
| 2,578,728 | Musser | Dec. 18, 1951 |
| 2,655,182 | Hayes | Oct. 13, 1953 |